(12) United States Patent
Belharouak et al.

(10) Patent No.: US 8,709,279 B2
(45) Date of Patent: Apr. 29, 2014

(54) PRODUCTION OF BATTERY GRADE MATERIALS VIA AN OXALATE METHOD

(75) Inventors: Ilias Belharouak, Bolingbrook, IL (US); Khalil Amine, Oakbrook, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 34 days.

(21) Appl. No.: 13/099,756

(22) Filed: May 3, 2011

(65) Prior Publication Data

US 2012/0280171 A1    Nov. 8, 2012

(51) Int. Cl.
*H01M 4/88* (2006.01)
*H01M 4/13* (2010.01)

(52) U.S. Cl.
USPC .................................. 252/182.1; 429/231.95

(58) Field of Classification Search
USPC ................ 429/223, 231.1, 231.95; 252/182.1
See application file for complete search history.

(56) References Cited

U.S. PATENT DOCUMENTS

| 3,876,557 | A | * | 4/1975 | Bland | 502/328 |
| 6,344,294 | B1 | * | 2/2002 | Torata et al. | 429/223 |
| 2006/0134517 | A1 | * | 6/2006 | Sawa et al. | 429/218.1 |
| 2006/0222958 | A1 | * | 10/2006 | Yamaguchi et al. | 429/324 |

FOREIGN PATENT DOCUMENTS

JP    06044970    *    2/1994

* cited by examiner

*Primary Examiner* — Ling-Siu Choi
*Assistant Examiner* — Monique Peets
(74) *Attorney, Agent, or Firm* — Foley & Lardner LLP

(57) ABSTRACT

An active electrode material for electrochemical devices such as lithium ion batteries includes a lithium transition metal oxide which is free of sodium and sulfur contaminants. The lithium transition metal oxide is prepared by calcining a mixture of a lithium precursor and a transition metal oxalate. Electrochemical devices use such active electrodes.

17 Claims, 7 Drawing Sheets

PRODUCTION OF BATTERY GRADE MATERIALS VIA AN OXALATE METHOD

GOVERNMENT RIGHTS

The United States Government has rights in this invention pursuant to Contract No. DE-AC02-06CH11357 between the United States Department of Energy and the UChicago Argonne, LLC representing Argonne National Laboratory.

FIELD

The technology relates to active materials for use in electrochemical devices such as lithium-ion batteries, and the preparation of such materials.

BACKGROUND

Since their first commercialization in the 1990s, rechargeable lithium-ion (Li-ion) batteries have served as major power sources for a wide range of electronic products. An increase in global energy demand, rising and fluctuating crude oil prices, and environmental concerns in recent years have led to an increase in demand for Li-ion batteries. In particular, Li-ion battery technology is being developed for applications in electric vehicles (EVs), hybrid electric vehicles (HEVs), and plug-in hybrid electric vehicles (PHEVs). For such applications, improved Li-ion batteries providing high energy density and high power capacity are required.

In general, the energy density of a Li-ion cell depends on the cathode material used in the cell. Typically, lithium transition metal oxides are used as lithium-ion battery cathode materials. In general, the morphology of such lithiated metal oxides is dependant on the starting metal precursors and the synthetic methods employed. Both of these considerations also play an important role in controlling the electrochemical properties of the cathode materials in Li-ion cells.

The most common industrial method for preparation of materials for Li-ion batteries is the hydroxide co-precipitation method. In this method, transition metal sulfates in aqueous solutions are reacted with sodium hydroxide solution under very corrosive alkaline conditions to fabricate transition metal hydroxides. The transition metal hydroxides are used to synthesize the lithium transition oxide materials that are used as positive active materials in lithium ion cells. As an alternative, a carbonate co-precipitation method may be used. Such a method uses sodium carbonate to synthesize battery grade materials. The advantage of this method over the hydroxide method is the preservation of the oxidation states of transition metals in the +2 oxidation state in the prepared carbonate precursors. However, both the hydroxide and carbonate co-precipitation methods may result in contamination of the precursors during the formation of particles with contaminants such as sodium and sulfur which are used in the precipitation processes. These species cannot be avoided even after extensive washing because they are precipitated as sodium sulfate $Na_2SO_4$ during the co-precipitation of the transition metal hydroxides and carbonates. The presence of such impurities in the electrode materials negatively impacts the performance of the Li-ion cells.

SUMMARY

In one aspect, an active electrode material is provided including a lithium transition metal oxide which is free of sodium and sulfur contaminants. The lithium transition metal oxide may be prepared by calcining a mixture of a lithium precursor and a transition metal oxalate. In some embodiments, the lithium transition metal oxide comprises a compound of formula $Li_x[M^1_\alpha M^2_\beta M^3_\gamma]O_z$; where $M^1$, $M^2$, and $M^3$ are transition metals; and where $0<x\leq2$; $0<\alpha\leq1$; $0\leq\beta\leq1$; $0<\gamma\leq1$; and $0<z\leq3$. In some embodiments, $M^1$ is Ni, Fe, Cu, Zn, Mg, Ca, Sr, or Ba; $M^2$ is Co, Cr, V, Y, La, Ce or Al; and $M^3$ is Mn, Ti, Zr, Nb, Mo, or Ru. In some embodiments, $M^1$ is Ni; $M^2$ is Co; and $M^3$ is Mn. In some embodiments, $1<x\leq2$; $0<\alpha\leq0.33$; $0\leq\beta\leq0.5$; $0<\gamma\leq0.8$; and $2<z\leq3$. In some embodiments, $1<x\leq2$; $0<\alpha\leq0.33$; $0\leq\beta\leq0.5$; $0<\gamma\leq0.8$; and $2<z\leq3$; and the sum of $\alpha$, $\beta$, and $\gamma$ is 1. In some embodiments, $1<x\leq2$; $0<\alpha\leq0.33$; $\beta=0$; $0<\gamma\leq0.8$; and $2<z\leq3$; and the sum of $\alpha$ and $\gamma$ is 1.

In some embodiments, the lithium transition metal oxide exhibits a capacity of greater than 200 mAh/g when used as a positive electrode in a Li coin cell. In some embodiments, the lithium precursor includes lithium carbonate, lithium hydroxide, lithium nitrate, lithium acetate, lithium oxalate, lithium hydride, lithium oxide, lithium peroxide, lithium sulfate, or lithium fluoride. In some embodiments, the transition metal oxalate includes a compound of formula $[M^1_{\alpha'}M^2_{\beta'}M^3_{\gamma'}]C_2O_4$; where $M^1$, $M^2$, and $M^3$ are transition metals; and where $0<\alpha'\leq1$; $0\leq\beta'\leq1$; and $0<\gamma'\leq1$. In some embodiments, $M^1$ is Ni, Fe, Cu, Zn, Mg, Ca, Sr, or Ba; $M^2$ is Co, Cr, V, Y, La, Ce or Al; and $M^3$ is Mn, Ti, Zr, Nb, Mo, or Ru. In some embodiments, $M^1$ is Ni; $M^2$ is Co; and $M^3$ is Mn. In some embodiments, $0<\alpha'\leq0.33$; $0\leq\beta'\leq0.5$; and $0<\gamma'\leq0.8$. In some embodiments, $0<\alpha'\leq0.33$; $0\leq\beta'\leq0.5$ and $0<\gamma'\leq0.8$; and the sum of $\alpha'$, $\beta'$, and $\gamma'$ is 1. In some embodiments, $0<\alpha'\leq0.33$; $\beta'=0$; and $0<\gamma'\leq0.8$ and the sum of $\alpha'$ and $\gamma'$ is 1.

In one aspect, a method of preparing a lithium transition metal oxide is provided including calcining a mixture of a lithium precursor and a transition metal oxalate. In some embodiments, the calcining is conducted at a temperature of from about 500° C. to about 1200° C. In some embodiments, the calcining is conducted at a temperature of from about 700° C. to about 1000° C.

In another aspect, a method is provided which includes preparing the transition metal oxalate by preparing a transition metal ion solution and a solution of oxalic acid and a precipitating agent; and adding the transition metal ion solution to the solution of the oxalic acid and the precipitating agent to precipitate the transition metal oxalate. In some embodiments, the precipitating agent includes ammonium hydrogen oxalate, di-ammonium oxalate, oxalic acid, lithium oxalate, sodium oxalate, potassium oxalate.

In some embodiments, the transition metal oxalate includes a compound of formula $[M^1_{\alpha'}M^2_{\beta'}M^3_{\gamma'}]C_2O_4$; where $M^1$, $M^2$, and $M^3$ are transition metals; and where $0<\alpha'\leq1$; $0\leq\beta'\leq1$; and $0<\gamma'\leq1$. In some embodiments, the transition metal ion solution comprises metal ions of Ni, Co, Mn, Fe, Cr, V, Ti, Cu, Zn, Mo, W, Zr, Nb, Ru or a mixture of any two or more thereof.

In another aspect, an electrode is provided that includes a transition metal oxide prepared by calcination of a lithium precursor and a transition metal carbonate.

DETAILED DESCRIPTION

Figure 1:
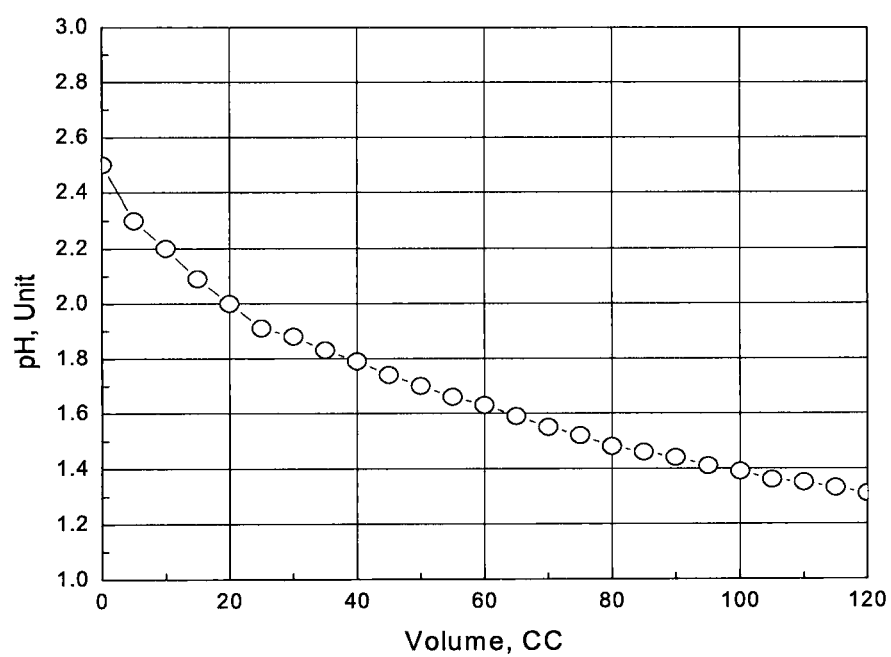
FIG. 1 is a graph showing the pH stability for $(Ni_{1/3}Co_{1/3}Mn_{1/3})C_2O_4\cdot2H_2O$, according to Example 1.

In one aspect, an active electrode material is provided including a lithium transition metal oxide which is free of sodium and sulfur contaminants. Such metal oxides are prepared from oxalate precursors that eliminate the need for the use of contaminating materials, including, but not limited to Na$_2$SO$_4$.

Accordingly, an active electrode material is provided which can be produced from a transition metal oxalate. In particular, the active electrode material is prepared by calcining a mixture of a lithium precursor and a transition metal oxalate. As used herein, "calcination" refers to thermal treatment of the mixture in an oxygen atmosphere. Typically, a material that is "calcined" is heated in a furnace, or like piece of equipment, to a temperature in excess of 400° C. in an inert atmosphere, an air atmosphere, or an atmosphere containing oxygen. Thus, in some embodiments, the mixture is calcined by heating from about 400° C. to about 1,200° C., or 700° C. to about 1,000° C., in either an inert atmosphere or in the presence of oxygen such as in air.

Lithium precursors suitable for use in the active electrode may include lithium salts such as, but not limited to, lithium carbonate, lithium hydroxide, lithium nitrate, lithium acetate, lithium oxalate, lithium hydride, lithium oxide, lithium peroxide, lithium sulfate, or lithium fluoride (Revised) or a mixture of any two or more thereof.

Transition metal oxalates suitable for use in the active electrode may include transition metals such as Ni, Co, Mn, Fe, Cr, V, Ti, Cu, Zn, Mo, W, Zr, Nb, Ru, or a mixture of any two or more thereof. For example, the transition metal oxalate may be an oxalate of any of the above metals singly or a mixture of oxalates of any two or more of the above metals. Where the transition metal oxalate is a mixture of oxalates, the ratio between the transition metals is based on the desired crystalline structure and electrochemical performances. In some embodiments, the transition metal oxalate may include waters of hydration.

In some embodiments, the lithium transition metal oxide includes a compound of formula Li$_x$[M$^1_\alpha$M$^2_\beta$M$^3_\gamma$]O$_z$; where M$^1$, M$^2$, and M$^3$ are transition metals; and where $0<x\leq2$; $0<\alpha\leq1$; $0\leq\beta\leq1$; $0<\gamma\leq1$; and $0<z\leq3$. In some embodiments, M$^1$ is Ni, Fe, Cu, Zn, Mg, Ca, Sr, or Ba; M$^2$ is Co, Cr, V, Y, La, Ce or Al; and M$^3$ is Mn, Ti, Zr, Nb, Mo, or Ru. In some embodiments, M$^1$ is Ni; M$^2$ is Co; and M$^3$ is Mn. In some embodiments, $1<x\leq2$; $0<\alpha\leq0.33$; $0\leq\beta\leq0.5$; $0<\gamma\leq0.8$; and $2<z\leq3$. In some embodiments, $1<x\leq2$; $0<\alpha\leq0.33$; $0\leq\beta\leq0.5$; $0<\gamma\leq0.8$; and $2<z\leq3$; and the sum of α, β, and γ is 1. In some embodiments, $1<x\leq2$; $0<\alpha\leq0.33$; $\beta=0$; $0<\gamma\leq0.8$; and $2<z\leq3$; and the sum of α and γ is 1. It is understood that the transition metal oxides may be in hydrated form.

The lithium transition metal oxides are prepared from the corresponding oxalates. Accordingly, in some embodiments, the transition metal oxalate includes a compound of formula [M$^1_{\alpha'}$M$^2_{\beta'}$M$^3_{\gamma'}$]C$_2$O$_4$; where M$^1$, M$^2$, and M$^3$ are transition metals; and where $0<\alpha'\leq1$; $0\leq\beta'\leq1$; and $0<\gamma'\leq1$. In some embodiments, M$^1$ is Ni, Fe, Cu, Zn, Mg, Ca, Sr, or Ba; M$^2$ is Co, Cr, V, Y, La, Ce or Al; and M$^3$ is Mn, Ti, Zr, Nb, Mo, or Ru. In some embodiments, M$^1$ is Ni; M$^2$ is Co; and M$^3$ is Mn. In some embodiments, $0<\alpha'\leq0.33$; $0\leq\beta'\leq0.5$; and $0<\gamma'\leq0.8$. In some embodiments, $0<\alpha'\leq0.33$; $0\leq\beta'\leq0.5$ and $0<\gamma'\leq0.8$; and the sum of α', β', and γ' is 1. In some embodiments, $0<\alpha'\leq0.33$; $\beta'=0$; and $0<\gamma'\leq0.8$ and the sum of α' and γ' is 1. It is understood that the transition metal oxides may be in hydrated form.

Such transition metal oxides have enhanced capacity as compared to the same transition metal oxide prepared by using the hydroxide or carbonate methods. In some embodiments, the lithium transition metal oxide exhibits a capacity greater than 200 mA/g when it is used as a positive electrode in Li coin cell.

In one aspect, a method is provided for preparing a lithium transition metal oxide for use as an active electrode material. The method includes calcining a mixture of a lithium precursor and a transition metal oxalate. The mixture may be calcined by heating at about 400° C. to about 1,200° C. In other embodiments, the mixture is calcined from about 700° C. to about 1,000° C. As noted, the calcination may be carried out in either an inert atmosphere or in the presence of oxygen. For example, the calcination may be carried out in a gas typically considered to be inert such as, but not limited to, nitrogen, helium, neon, or argon. The calcination may also be carried out in pure oxygen, air, or in a mixture with other gases such as carbon dioxide, nitrogen, helium, neon, argon, or a mixture of any two or more such gases.

The transition metal oxalate(s) may be prepared by preparing a transition metal ion solution and a solution of oxalic acid and a precipitating agent; and adding the transition metal ion solution to the solution of the oxalic acid and the precipitating agent to precipitate the transition metal oxalate. The transition metal ion solution is prepared from metal salts of the transition metals. Accordingly, the transition metal salts include sulfate, nitrate, acetate, or phosphate of one or more of Ni, Co, Mn, Fe, Cr, V, Ti, Cu, Zn, Mo, W, Zr, Nb, or Ru. Depending on the desired metal composition in the lithium transition metal oxide, aqueous solutions of metal salts of different metals can be added to form a transition metal ion solution. In some embodiments, the concentration of the metal ions in the combined metal salt solution is from about 0.1M to about 3M. In other embodiments, the concentration of the metal ions in the combined metal salt solution is from about 0.5M to about 2M. In other embodiments, the concentration of the metal ions in the combined metal salt solution is about 1M.

As noted above, the precipitation may be carried out in the presence of a precipitating agent. Suitable precipitating agents include, but are not limited to, ammonium hydrogen oxalate, di-ammonium oxalate, oxalic acid, lithium oxalate, sodium oxalate, potassium oxalate, or mixture thereof. In some embodiments, the concentration of the precipitating agent is from about 0.5M to about 1M in the original solution of precipitating agent. In other embodiments, the concentration of the precipitating agent is less than 0.5M. In yet other embodiments, the concentration of the precipitating agent is greater than 1M.

In some embodiments, the concentration of the oxalic acid is from about 0.1M to about 2M in the original solution of oxalic acid. In some embodiments, the concentration of the oxalic acid is about 1M.

The pH of the solution may be monitored and adjusted during precipitation such that it remains constant or at a target pH. In one embodiment, the target pH is between 2 and 8. In other embodiments, the target pH is between 3 and 5. In other embodiments, the temperature of the precipitation is about 30° C. to about 100° C. In yet other embodiments, the temperature of the precipitation is about 50° C. to about 80° C. In some other embodiments, the temperature of the precipitation is about 70° C.

In some embodiments, the transition metal oxalates that precipitate include particles of different shapes including irregular shapes. In some embodiments, the particles have various shapes including approximately diamond, spherical, needle or planar shapes. Particles with diamond shape, as understood by those skilled in the art, are 3D particles roughly shaped like a cube with six or more faces. These outer surface of the particles are characterized by straight edges. Use of the term "diamond" does not mean that every particle is a perfect diamond, merely that a majority of the particles have a general diamond shape at the micron level. In some embodiments, the particles have an average size from about 0.1 µm to 100 µm. In some embodiments, the particles have a size between 5 and 20 µm.

In another aspect, an electrode is provided including a lithium transition metal oxide which is prepared from a transition metal oxalate. In some embodiments, the electrodes are cathodes and/or anodes for use in an electrochemical device. In one embodiment, the electrode is a cathode. In some embodiments, the lithiated transition metal oxide described herein may be blended or mixed with lithium transition metal oxide produced by other methods. Other lithium transition metal oxides refers to same or similar compositions that are made using another method such as the hydroxide or carbonate methods. Depending on the method of preparation, the same lithiated transition metal oxide may have different properties when used as an electroactive material in an electrochemical cell. By blending lithiated transition metal oxides made using different methods, electroactive materials with unique properties can be prepared. In some embodiments, blending lithiated transition metal oxides prepared from a transition metal oxalate with other lithiated transition metal oxides prepared from a transition metal hydroxide or carbonate or both, may be used to increase the energy and power densities of the lithiated transition metal oxide mixtures.

The electrodes described above may be used in a wide variety of electrochemical devices. Such devices may include, but are not limited to batteries and capacitors. Such devices may include a cathode including the transition metal oxide as prepared from the transition metal oxalate; an anode; and a non-aqueous electrolyte. The anode in such devices may include, but is not limited to, graphite, amorphous carbon, $Li_4Ti_5O_{12}$, tin alloys, silicon alloys, intermetallic compounds, lithium metal, or mixtures of any two or more thereof. Suitable graphite materials may include, but are not limited to, natural graphite, hard carbon, soft carbon, petroleum coke, artificial graphite, graphitized meso-carbon microbeads, graphite fibers, graphene, graphene oxide, carbon nanotubes, or amorphous carbon materials.

The non-aqueous electrolyte may be any conventional or otherwise suitable organic electrolyte known in the art and includes a polar aprotic solvent and a salt. A variety of solvents may be employed in the electrolyte as the polar aprotic solvent. Some illustrative polar aprotic solvents include liquids and gels capable of solubilizing sufficient quantities of the lithium salt and the redox shuttle so that a suitable quantity of charge can be transported from the positive electrode to negative electrode. The solvents can be used over a wide temperature range, e.g., from −30° C. to 70° C. without freezing or boiling, and are stable in the electrochemical range within which the cell electrodes and shuttle operate. Suitable solvents include, but are not limited to, dimethyl carbonate; ethyl methyl carbonate; diethyl carbonate; methyl propyl carbonate; ethyl propyl carbonate; dipropyl carbonate; bis(trifluoroethyl)carbonate; bis(pentafluoropropyl)carbonate; trifluoroethyl methyl carbonate; pentafluoroethyl methyl carbonate; heptafluoropropyl methyl carbonate; perfluorobutyl methyl carbonate; trifluoroethyl ethyl carbonate; pentafluoroethyl ethyl carbonate; heptafluoropropyl ethyl carbonate; perfluorobutyl ethyl carbonate; fluorinated oligomers; dimethoxyethane; triglyme; dimethylvinylene carbonate; tetraethyleneglycol; dimethyl ether; polyethylene glycols; sulfones; and γ-butyrolactone.

Suitable salts that may be used in the electrolytes, include, but are not limited to, $Li[B(C_2O_4)_2]$; $Li[BF_2(C_2O_4)]$; $LiClO_4$; $LiBF_4$; $LiAsF_6$; $LiSbF_6$; $LiBr$; $LiPF_6$; $Li[CF_3SO_3]$; $Li[N(CF_3SO_2)_2]$; $Li[C(CF_3SO_2)_3]$; $Li[B(C_6F_5)_4]$; $Li[B(C_6H_5)_4]$; $Li[N(SO_2CF_3)_2]$; $Li[N(SO_2CF_2CF_3)_2]$; $LiN(SO_2C_2F_5)_2$; $Li[BF_3C_2F_5]$; and $Li[PF_3(CF_2CF_3)_3]$; and lithium alkyl fluorophosphates.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology, thus generally described, will be understood more readily by reference to the following examples, which are provided by way of illustration and are not intended to be limiting.

EXAMPLES

Example 1

Preparation of $N_{1/3}CO_{1/3}Mn_{1/3}C_2O_4 \cdot 2H_2O$. In a first vessel, nickel sulfate hydrate, cobalt sulfate hydrate, and manganese sulfate hydrate were dissolved in water, with stirring, to prepare a 1 M solution of Ni, Co, and Mn ions in a 1:1:1 ratio. In other words, the solution contains 0.33M Ni, 0.33 M Co, and 0.33M Mn. In second vessel, oxalic acid was dissolved in water, with stirring, to prepare a 1 M aqueous solution. In a third vessel, ammonium hydrogen oxalate was dissolved in water, with stirring, to prepare a 1 M solution. The oxalic acid solution was then added to the ammonium hydrogen oxalate solution, with stirring.

The metal solution in the first vessel was then added dropwise to the mixture of the oxalic acid and oxalate, until precipitation of metal oxalate particles was observed. The pH of the oxalic acid/oxalate solution was monitored during addition of the transition metal solution. FIG. 1 is a graph of the pH change of the oxalic acid/oxalate solution as a function of the volume of addition. Initially, the pH of the solution was 2.5 and no precipitation occurred. At about pH 2.2 precipitation began. The addition of metal solution continued thereafter. Throughout the addition of the metal solution, the temperature of the solutions was held constant at 70° C.

The precipitate was then collected by filtration, washed with water, and dried at 100° C. SEM images of the $Ni_{1/3}Co_{1/}$ $Mn_{1/3}C_2O_4 \cdot 2H_2O$ were obtained. The images show large, clear cut and dense particles having a cuboid shape with dimensions of about 10 μm on a side. An XRD (x-ray diffraction) pattern of the particles was recorded and found to exhibit similar peaks as that of $FeC_2O_4 \cdot 2H_2O$.

Figure 2:
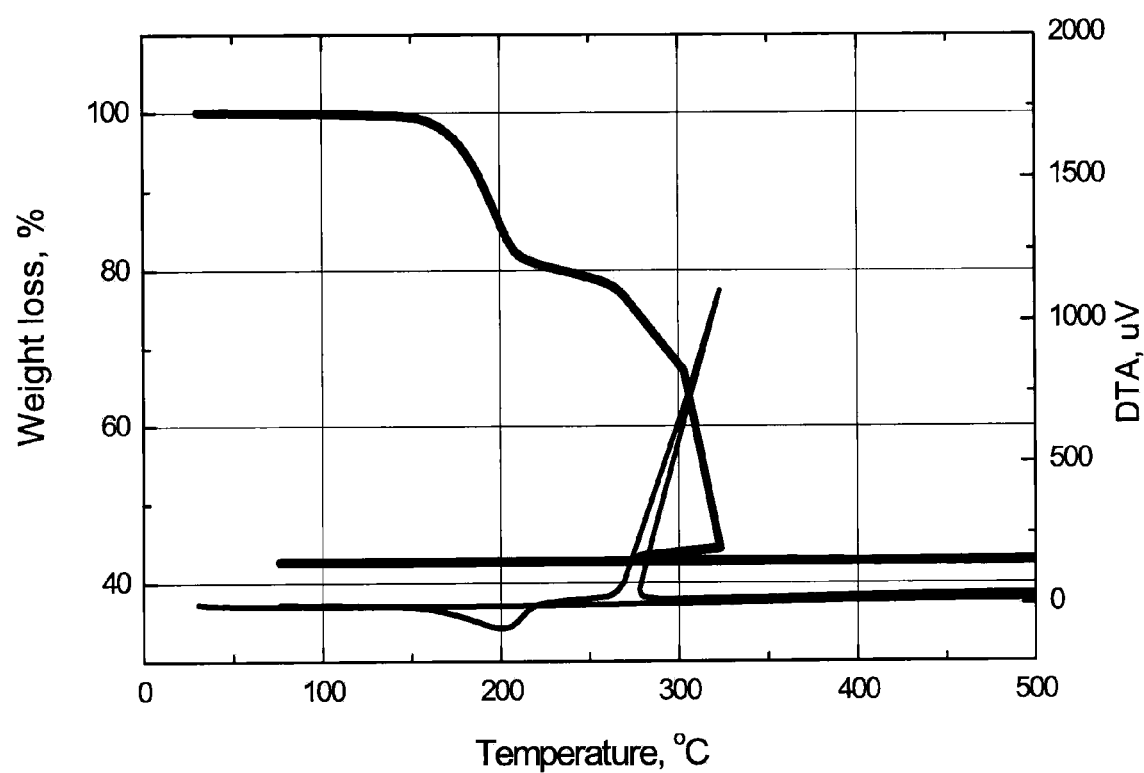
FIG. 2 depicts a thermogravimetric analysis (TGA) and differential thermal analysis of $(Ni_{1/3}CO_{1/3}Mn_{1/3})C_2O_4\cdot2H_2O$, prepared according to Example 1.

The $Ni_{1/3}Co_{1/3}Mn_{1/3}C_2O_4 \cdot 2H_2O$ was analyzed by TGA (thermal gravimetric analysis). FIG. 2 is a graph of the TGA from room temperature to 500° C. The first weight loss, observed between 150 and 225° C., is attributed to the loss of the waters of hydration. The second major loss, observed between 225 and 325° C. is attributed to the loss of the oxalic group ($C_2O_4^{2-}$). The 57% weight loss is consistent with the chemical formula of $Ni_{1/3}Co_{1/3}Mn_{1/3}C_2O_4 \cdot 2H_2O$. The loss of water from $Ni_{1/3}Co_{1/3}Mn_{1/3}C_2O_4 \cdot 2H_2O$ is an endothermic phenomenon, whereas the loss of the oxalic group is an exothermic phenomenon.

After the TGA, an XRD of the material that remained after heating at 500° C. revealed that it had a similar pattern to that of $NiMn_2O_4$, confirming that upon heating the $Ni_{1/3}Co_{1/3}Mn_{1/3}C_2O_4 \cdot 2H_2O$ decomposes to $NiCoMnO_4$, having a spinal-like structure. SEM images of the $NiCoMnO_4$ were recorded, and illustrate parallel layers of highly ordered nanoparticulates of less than about 100 nm.

Example 2

Preparation of $LiNi_{1/3}Co_{1/3}Mn_{1/3}O_2$. Lithium carbonate was added to the particles of $Ni_{1/3}Co_{1/3}Mn_{1/3}C_2O_4 \cdot 2H_2O$ at a ratio of Li:Ni:Co:Mn of 1:0.33:0.33:0.33, and the materials were mixed in a dry mixer. This mixture was then calcined at 900° C. for 12 hours to yield $LiNi_{1/3}CO_{1/3}Mn_{1/3}O_2$.

Example 3

Preparation of $Li_{1.1}Ni_{1/3}CO_{1/3}Mn_{1/3}O_2$. The same procedure of Example 2 was followed, but with a ratio of Li:Ni:Co:Mn of 1.1:0.33:0.33:0.33.

SEM images of the $Li_{1.1}Ni_{1/3}CO_{1/3}Mn_{1/3}O_2$ were recorded. The images show micro-porous particles having nano-pores. Both characteristics are unique to the oxalate precursor due to the removal of water and oxalic groups occur as the temperature of the reaction increases.

Example 4

Preparation of $Li_{1.15}Ni_{1/3}CO_{1/3}Mn_{1/3}O_2$. The same procedure of Example 2 was followed, but with a ratio of Li:Ni:Co:Mn of 1.15:0.33:0.33:0.33.

Example 5

Figure 3:
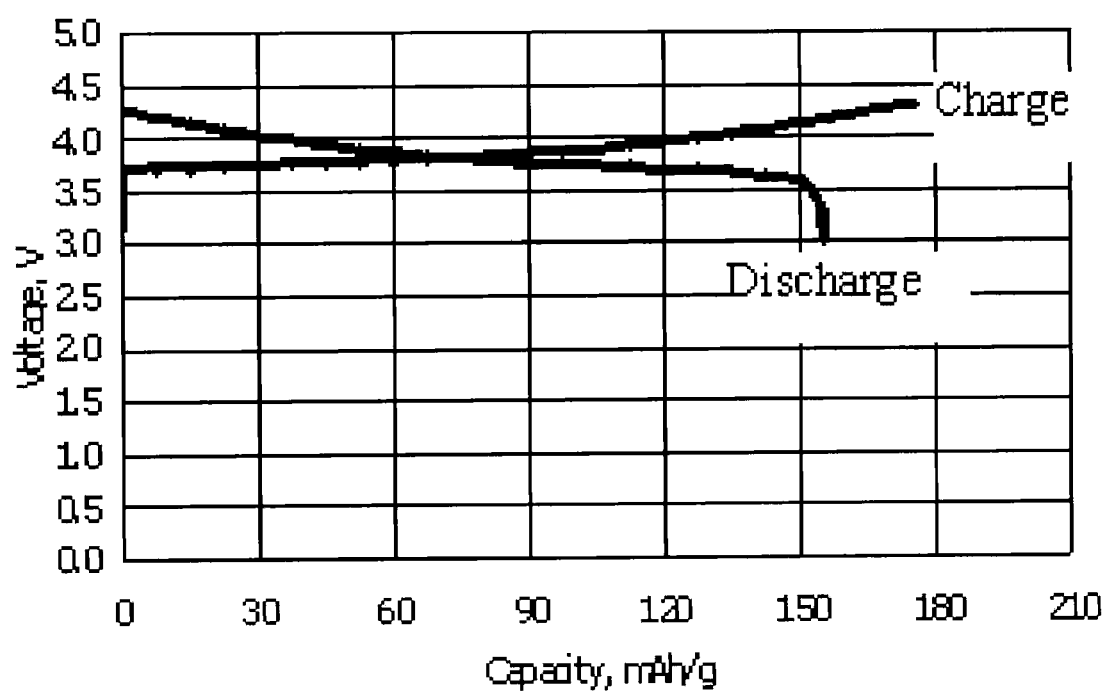
FIG. 3 depicts the charge and discharge cycle during the first cycle of the $Li_{1.1}(Ni_{1/3}Co_{1/3}Mn_{1/3})O_2$ material used as the active cathode component in a Li/Li$_{1.1}$(Ni$_{1/3}$CO$_{1/3}$Mn$_{1/3}$)O$_2$ cell, according to Example 5.
Figure 4:
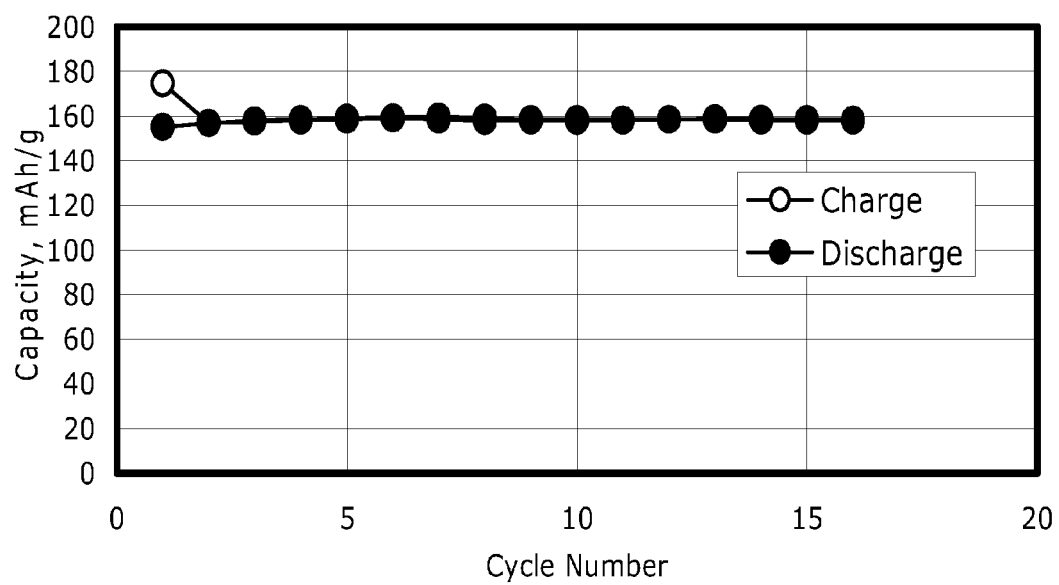
FIG. 4 depicts the charge and discharge capacity during the 16 cycles of the Li$_{1.1}$(Ni$_{1/3}$CO$_{1/3}$ Mn$_{1/3}$)O$_2$ material used as the active cathode component in a Li/Li$_{1.1}$(Ni$_{1/3}$CO$_{1/3}$ Mn$_{1/3}$)O$_2$ cell, according to Example 5.

Coin cell. The performance of the $Li_{1.1}(Ni_{1/3}CO_{1/3}Mn_{1/3})O_2$ was tested in a coin-cell battery. A positive electrode was made by coating a paste of 80 wt % of $Li_{1.1}(Ni_{1/3}Co_{1/3}Mn_{1/3})O_2$, 10 wt % of acetylene black carbon as a conducting additive, and 10 wt % polyvinylidene fluoride (PVDF) binder on an aluminum foil. Coin-cells (CR2031) were assembled inside a glove box using the positive electrode, and a lithium metal counter electrode. An electrolyte of 1.2 M $LiPF_6$ in (EC:PC:DMC) (1:1:3 wt %) was used. The cells were charged to 4.3 V and the charge/discharge capacity was monitored. FIG. 3 depicts the first charge and discharge profile curve of $Li_{1.1}(Ni_{1/3}Co_{1/3}Mn_{1/3})O_2$. The discharge capacity after 12 hours (C/12) of discharge was 158 mAh/g. FIG. 4 depicts the capacity of the coin cell after 16 cycles under C/12, and shows that the capacity was retained over the cycles indicating that the performance is stable and efficient.

Example 6

Figure 5:
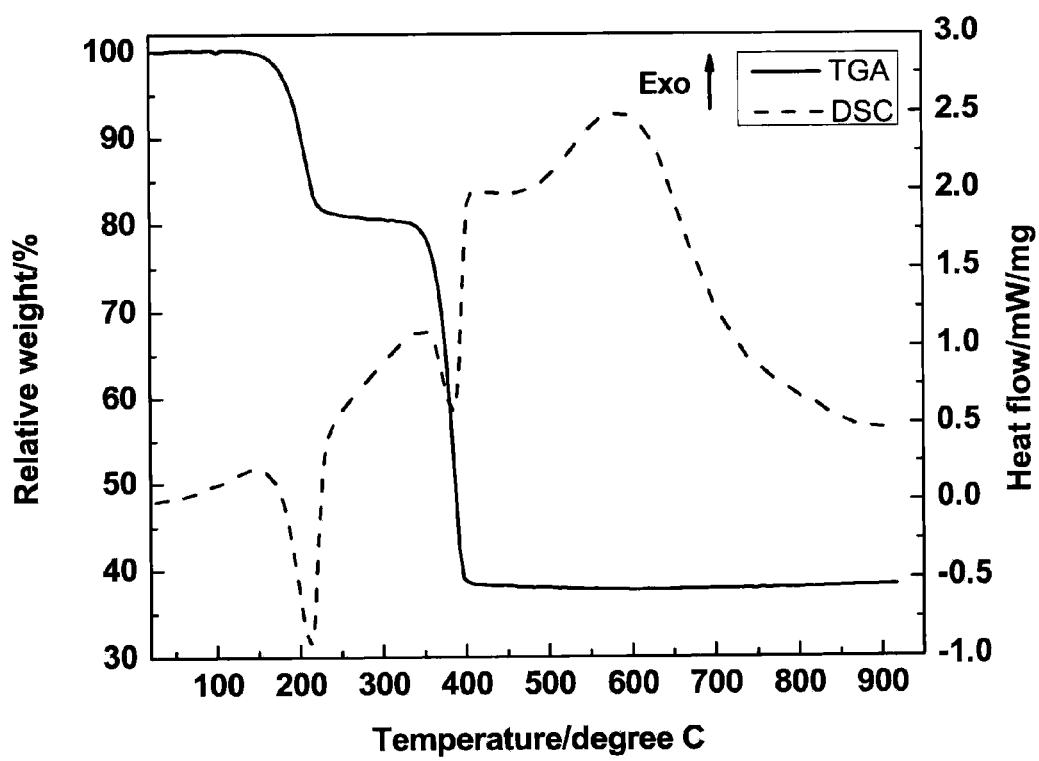
FIG. 5 depicts the TGA graph of (Ni$_{0.25}$Mn$_{0.75}$)C$_2$O$_4 \cdot$2H$_2$O, according to Example 6.

Preparation of $Ni_{0.25}Mn_{0.75}C_2O_4 \cdot 2H_2O$. In a first vessel, nickel sulfate hydrate and manganese sulfate hydrate were dissolved in water to prepare a 1 M aqueous transition metal solution with a ratio of Ni to Mn of 1:3 on a mol basis. This metal solution was then added to a second vessel containing oxalic acid at a constant temperature of 70° C., to form a metal oxalate precipitate. The precipitate $Ni_{0.25}Mn_{0.75}C_2O_4 \cdot 2H_2O$ was collected by filtration, washed several times with water, and dried at 100° C. for several hours. FIG. 5 is a TGA curve of $Ni_{0.25}Mn_{0.75}C_2O_4 \cdot 2H_2O$. The first step in the curve corresponds to the removal of water (20% weight loss), and the second step corresponds to the removal of $CO_2$ (additional 40% weight loss). The weight loss confirms the chemical composition of $Ni_{0.25}Mn_{0.75}C_2O_4 \cdot 2H_2O$. The complete decomposition of this oxalate compound occurs at 400° C., which is significantly lower than the temperature required conversion of a carbonate precursor to a metal oxide. In the carbonate method, temperature of 600° C., or more, are required.

Example 7

Preparation of $LiNi_{0.25}Mn_{0.75}O_2$. Lithium carbonate was added to the particles of $Ni_{0.25}Mn_{0.75}C_2O_42H_2O$ at a ratio of Li:Ni:Mn of 1:0.25:0.75, and the materials were mixed in a dry mixer. This mixture was then calcined at 900° C. for 12 hours to yield $LiNi_{0.25}Mn_{0.75}O_2$. An SEM image of $Li_{1.5}Ni_{0.25}Mn_{0.75}O_{2.5}$ was recorded and shows submicron, aligned primary particles suitable for facile lithium extraction and insertion and high rate capability battery applications.

Figure 6:
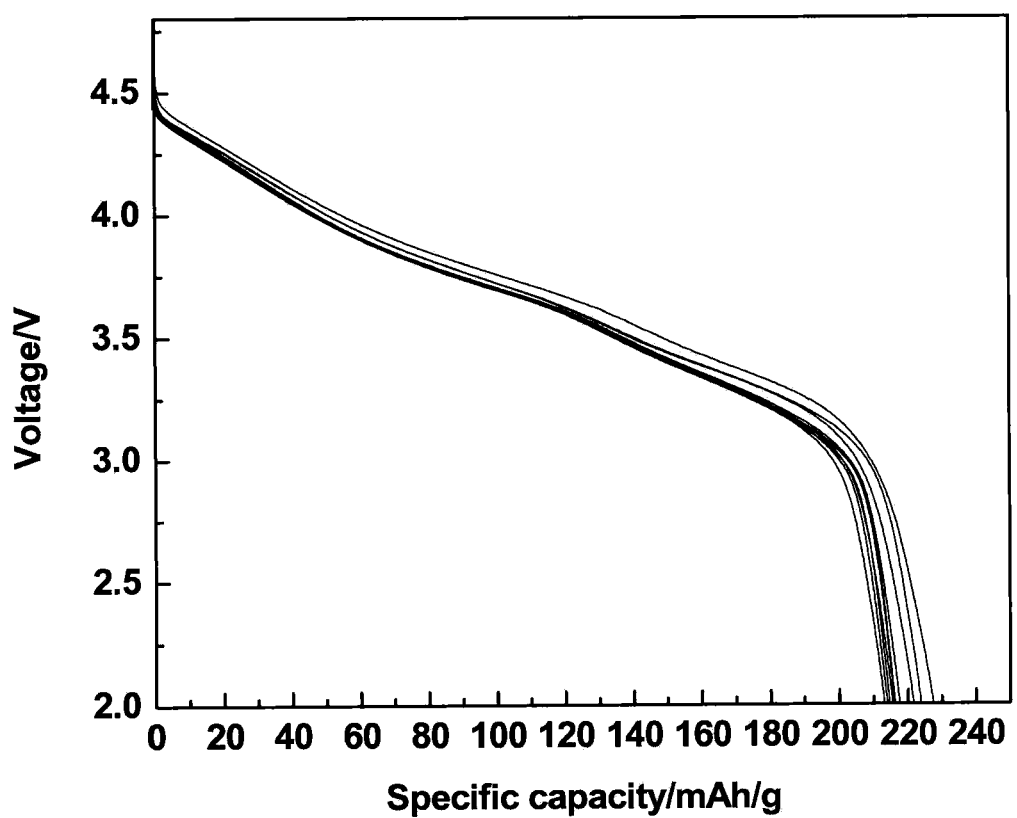
FIG. 6 is a graph of the specific capacity Li$_{1.5}$Ni$_{0.25}$Mn$_{0.75}$O$_{2.5}$ as a function of voltage, according to Example 7.
Figure 7:
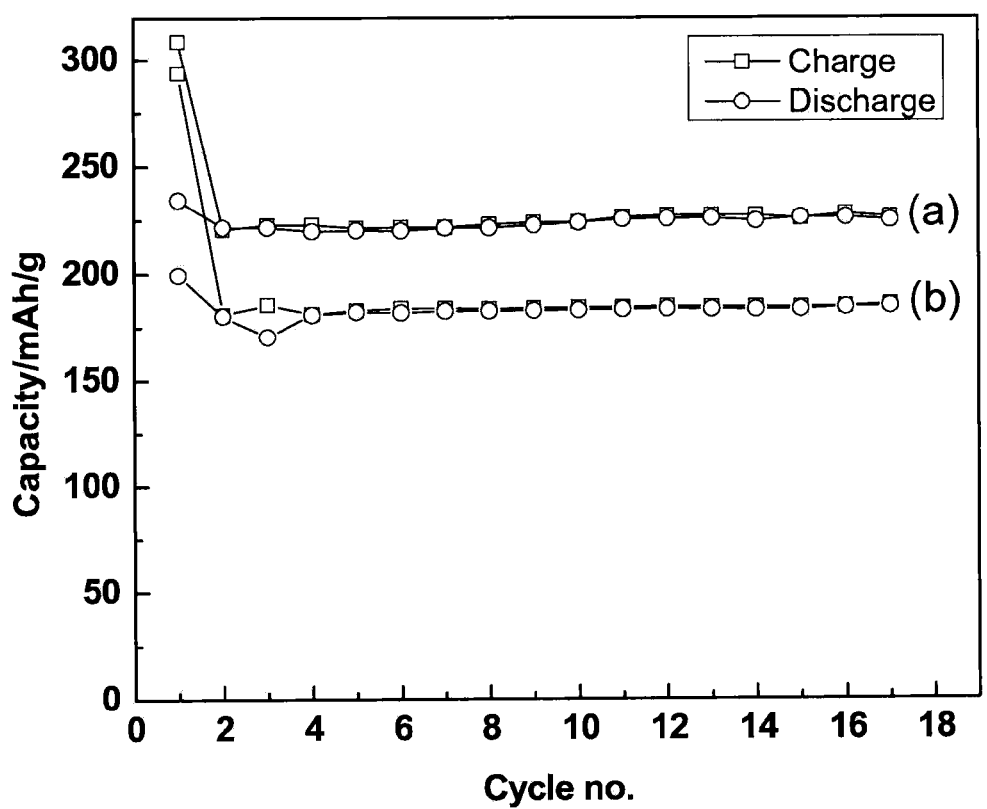
FIG. 7 is a graph comparing the cycling properties of Li$_{1.5}$Ni$_{0.25}$Mn$_{0.75}$O$_{2.5}$, according to Example 7, and the same chemical composition, prepared by the carbonate method.

FIG. 6 is a graph of the specific capacity $Li_{1.5}Ni_{0.25}Mn_{0.75}O_{2.5}$ as a function of voltage. The capacity of the material is 224 mAh/g when charged between 2 and 4.6 V FIG. 7 is a comparison of the cycling properties of $Li_{1.5}Ni_{0.25}Mn_{0.75}O_{2.5}$ (a), with the same chemical composition prepared by mixing $Ni_{0.25}Mn_{0.75}CO_3$ carbonate and lithium carbonate $Li_2CO_3$ and firing the mixture at 900° C. for 15 hours (b). The two materials were tested as the active cathode component in a $Li/Li_{1.1}(Ni_{1/3}CO_{1/3}Mn_{1/3})O_2$ cell. When both materials are charged to 4.6 V and discharged to 2V for several cycles, the material prepared via the transition metals oxalate source (a) showed a capacity of 224 mAh/g versus a capacity of only 183 mAh/g, that the material made via the transition metal carbonate source.

While some embodiments have been illustrated and described, it should be understood that changes and modifications can be made therein in accordance with ordinary skill in the art without departing from the invention in its broader aspects as defined in the following claims.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of preparing a lithium transition metal oxide comprising:
   preparing a first solution comprising transition metal ions;
   preparing a second solution comprising oxalic acid and a precipitating agent;
   adding the first solution to the second solution to form a combined solution and a precipitate of a transition metal oxalate; and
   calcining a mixture of a lithium precursor and the transition metal oxalate to form the lithium transition metal oxide;
   wherein:
      the precipitating agent comprises ammonium hydrogen oxalate, di-ammonium oxalate, lithium oxalate, sodium oxalate, potassium oxalate, or a mixture thereof; and
      the transition metal oxalate comprises a compound of formula $[M^1_{\alpha'}M^2_{\beta'}M^3_{\gamma'}]C_2O_4$;

$M^1$, $M^2$, and $M^3$ are transition metals; and
   $0<\alpha'\leq 1$; $0<\beta'\leq 1$; and $0<\gamma'\leq 1$.

2. The method of claim 1, wherein the calcining is conducted at a temperature of from about 400° C. to about 1200° C.

3. The method of claim 1, wherein a concentration of the precipitating agent in the second solution is from about 0.5M to about 1.5M.

4. The method of claim 1, wherein a pH of the combined solution during adding of the first solution to the second solution is below about 2.2.

5. The method of claim 1, wherein the transition metal ions comprise at least three of Ni, Co, Mn, Fe, Cr, V, Ti, Cu, Zn, Mo, W, Zr, Nb, or Ru.

6. The method of claim 1, wherein:
   the lithium transition metal oxide comprises a compound of formula $Li_x[M^1_{\alpha}M^2_{\beta}M^3_{\gamma}]O_z$;

$M^1$, $M^2$, and $M^3$ are transition metals; and
   $0<x\leq 2$; $0<\alpha\leq 1$; $0<\beta'\leq 1$; $0<\gamma\leq 1$; and $0<z\leq 3$.

7. The method of claim 6, wherein $M^1$ is Ni, Fe, Cu, Zn, Mg, Ca, Sr, or Ba; $M^2$ is Co, Cr, V, Y, La, Ce or Al; and $M^3$ is Mn, Ti, Zr, Nb, Mo, or Ru.

8. The method of claim 6, wherein $M^1$ is Ni; $M^2$ is Co; and $M^3$ is Mn.

9. The method of claim 6, wherein $1<x\leq 2$; $0<\alpha\leq 0.33$; $0<\beta'\leq 0.5$; $0<\gamma\leq 0.8$; and $2<z\leq 3$; and the sum of $\alpha$, $\beta$, and $\gamma$ is 1.

10. The method of claim 6, wherein the lithium transition metal oxide exhibits a capacity of greater than 200 mAh/g in a Li coin cell.

11. The method of claim 1, wherein the lithium precursor comprises lithium carbonate, lithium hydroxide, lithium nitrate, lithium acetate, lithium oxalate, lithium hydride, lithium oxide, lithium peroxide, lithium sulfate, or lithium fluoride.

12. A method of preparing a lithium transition metal oxide comprising:
   preparing a first solution comprising transition metal ions;
   preparing second solution comprising oxalic acid and a precipitating agent;
   adding the first solution to the second solution to form a combined solution and a precipitate of a transition metal oxalate; and
   calcining a mixture of a lithium precursor and the transition metal oxalate;
   wherein:
      the precipitating agent comprises ammonium hydrogen oxalate, di-ammonium oxalate, lithium oxalate, sodium oxalate, potassium oxalate, or mixture thereof;

the lithium transition metal oxide comprises a compound of formula $Li_x[M^1_\alpha M^2_\beta M^3_\gamma]O_z$;

$M^1$, $M^2$, and $M^3$ are transition metals; and
$1<x\leq 2$; $0<\alpha\leq 0.33$; $0\leq\beta\leq 0.5$; $0<\gamma\leq 0.8$; and $2<z\leq 3$; and the sum of $\alpha$, $\beta$, and $\gamma$ is 1; and the transition metal oxalate comprises a compound of formula $[M^1_{\alpha'}M^2_{\beta'}M^3_{\gamma'}]C_2O_4$; and $0<\alpha'\leq 0.33$; $0\leq\beta'\leq 0.5$; and $0<\gamma'\leq 0.8$; and the sum of $\alpha'$, $\beta'$, and $\gamma'$ is 1.

13. The method of claim 12, wherein the calcining is conducted at a temperature of from about 400° C. to about 1200° C.

14. The method of claim 12, wherein the lithium precursor comprises lithium carbonate, lithium hydroxide, lithium nitrate, lithium acetate, lithium oxalate, lithium hydride, lithium oxide, lithium peroxide, lithium sulfate, or lithium fluoride.

15. A method of preparing a lithium transition metal oxide comprising:
preparing a first solution comprising transition metal ions;
preparing a second solution comprising oxalic acid and a precipitating agent;
adding the first solution to the second solution to form a combined solution and a precipitate of a transition metal oxalate; and
calcining a mixture of a lithium precursor and the transition metal oxalate;
wherein:
the precipitating agent comprises ammonium hydrogen oxalate, di-ammonium oxalate, lithium oxalate, sodium oxalate, potassium oxalate, or mixture thereof;
the lithium transition metal oxide comprises a compound of formula $Li_x[M^1_\alpha M^2_\beta M^3_\gamma]O_z$;

$M^1$, $M^2$, and $M^3$ are transition metals; and
$1<x\leq 2$; $0<\alpha\leq 0.33$; $0\leq\beta$; $0<\gamma\leq 0.8$; and $2<z\leq 3$; and the sum of $\alpha$ and $\gamma$ is 1; and the transition metal oxalate comprises a compound of formula $[M^1_{\alpha'}M^2_{\beta'}M^3_{\gamma'}]C_2O_4$; and $0<\alpha'\leq 0.33$; $0\leq\beta'$; and $0<\gamma'\leq 0.8$; and the sum of $\alpha'$ and $\gamma'$ is 1.

16. The method of claim 15, wherein the calcining is conducted at a temperature of from about 400° C. to about 1200° C.

17. The method of claim 15, wherein the lithium precursor comprises lithium carbonate, lithium hydroxide, lithium nitrate, lithium acetate, lithium oxalate, lithium hydride, lithium oxide, lithium peroxide, lithium sulfate, or lithium fluoride.

* * * * *